United States Patent [19]

Gregory

[11] 4,206,733

[45] Jun. 10, 1980

[54] FUEL GASIFYING SYSTEM

[76] Inventor: Randy K. Gregory, 701 W. 49th Ave., Gary, Ind. 46408

[21] Appl. No.: 894,165

[22] Filed: Apr. 6, 1978

[51] Int. Cl.² .................... F02M 31/00; F02M 17/18
[52] U.S. Cl. .............................. 123/133; 123/122 E;
48/180 C; 261/DIG. 39
[58] Field of Search ............. 123/122 E, 32 JV, 133;
261/DIG. 39, DIG. 74; 48/180 R, 180 C, 180 B

[56] References Cited

U.S. PATENT DOCUMENTS

| 1,893,457 | 1/1933 | Tartrais | 261/DIG. 39 |
| 1,895,470 | 1/1933 | Mathiew | 261/DIG. 39 |
| 3,664,818 | 5/1972 | Kramer | 261/DIG. 39 |
| 3,738,334 | 6/1973 | Farr | 123/122 E |
| 3,968,775 | 7/1976 | Harpman | 123/122 E |
| 4,085,719 | 4/1978 | Hamburg | 123/122 E |
| 4,103,658 | 8/1978 | Bernecker | 123/122 E |

FOREIGN PATENT DOCUMENTS

| 23970 | 12/1968 | China | 261/DIG. 39 |
| 465611 | 4/1923 | France | 261/DIG. 39 |

Primary Examiner—Ronald H. Lazarus
Attorney, Agent, or Firm—John S. Wrona

[57] ABSTRACT

A fuel gasifying system for a piston-type internal combustion engine including an expansible gas chamber disposed between a fuel pump and a heated fuel line section and an air cannister including a gas injector and plate arrangement for achieving a proper air-fuel mixture.

4 Claims, 2 Drawing Figures

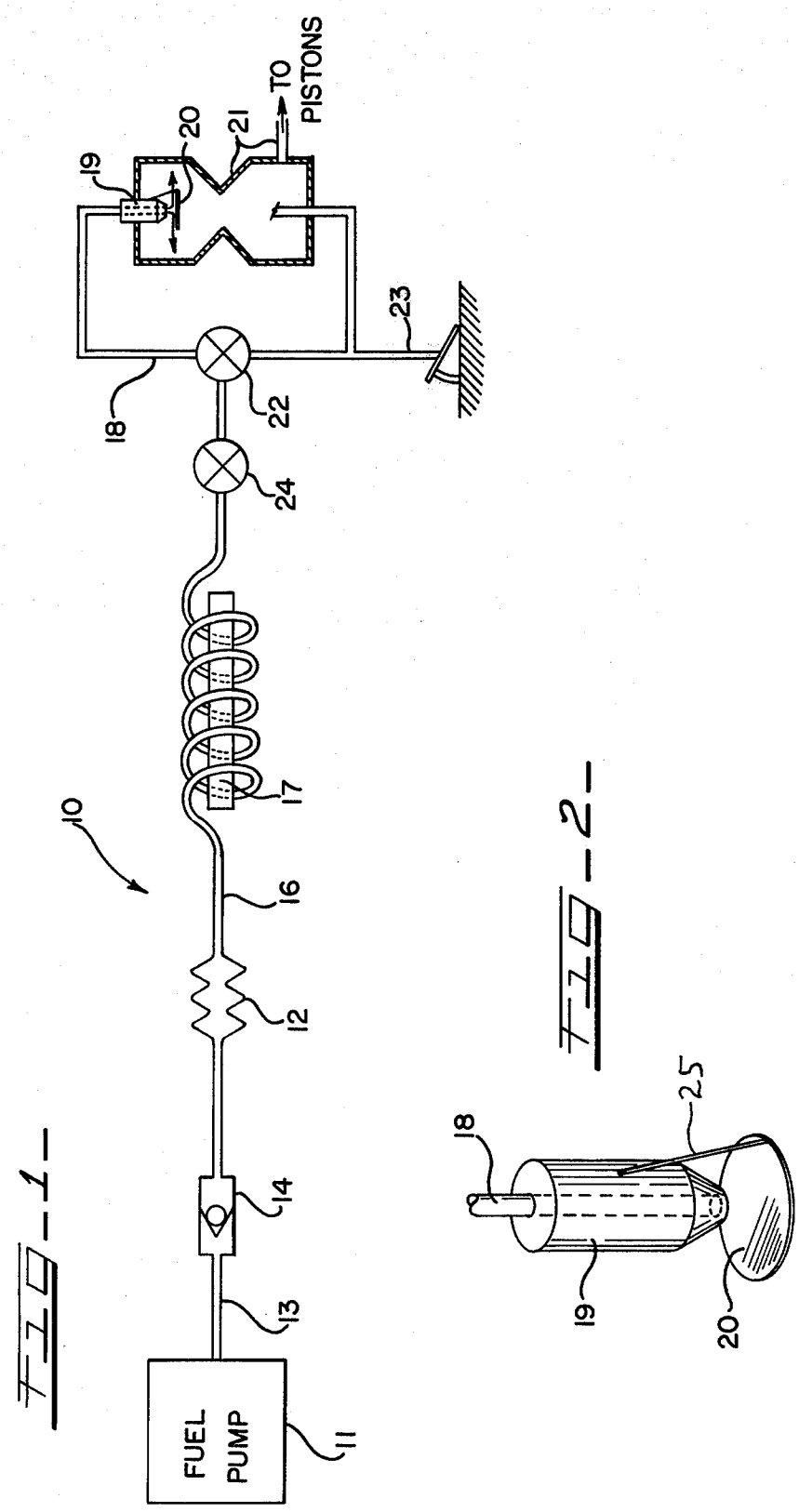

FUEL GASIFYING SYSTEM

BACKGROUND AND SUMMARY OF THE INVENTION

The present invention relates to a fuel gasifying system for an internal combustion engine.

Fuel systems for internal combustion engines have generally included standard carburetors in which liquid fuel is intermittently mixed with a stream of air to separate the fuel into fine droplets approaching vaporization. These droplets are distributed for burning to the various cylinders of the engine. The use of a fuel system with a carburetor results in incomplete combustion of the fuel droplets which is not only uneconomical but also causes the exhaust of large quantities of hydro-carbons, carbon monoxide, and oxides of nitrogen.

Fuel injection systems have also been used to improve fuel economy. Such fuel injection systems provide a smooth controlled flow of fuel rather than the intermittent pulsating supply as occurs in the carburetor system. This creates a more usable supply of fuel while at the same time improving performance. However, fuel injection systems for internal combustion engines commonly found on the market are limited in application to injecting liquid fuels under pressure.

By the present invention it is proposed to provide a fuel gasifying system which greatly improves fuel economy and also reduces the pollutants.

This is accomplished by a system which may be applied as original equipment for use with an internal combustion engine or as a modification or kit for attachment to an existing piston type internal combustion engine such as is used in an ordinary common automobile.

The fuel gasifying system is adapted to be used with a fuel pump which serves to pump fuel through the fuel line. Connected to the fuel pump is an expansible fuel storage chamber which is constructed so as to substantially eliminate the pulsations caused by the fuel pump. A heated fuel line is connected to an accelerator actuated fuel metering device which serves to deliver a metered quantity of gasolene liquid or vapors to an injector and disbursed in the carburetor which merely serves as an air flow cannister to the engine chambers for ignition in the usual manner.

BRIEF DESCRIPTION OF THE DRAWINGS

FIG. 1 is a diagrammatic view of the fuel gasifying system of the present invention incorporated in a fuel supply system of an internal combustion engine.

FIG. 2 is a pictorial view of the gas injector and plate arrangement shown in FIG. 1.

DESCRIPTION OF THE PREFERRED EMBODIMENT

Referring now to the drawings the fuel gasifying system 10 of the invention is applied as a kit for modifying a conventional fuel gas system employed in piston-type internal combustion engines. Such engines conventionally include the well known fuel pump that is operated by a lobe of the cam shaft to actuate a diaphram so as to pulsatingly pump liquid gasolene through a fuel line.

In accordance with the present invention an expansible chamber 12 is connected to the outlet end of the fuel pump 11 by way of a line 13. Disposed in the line 13 is a one way check valve 14 which serves to prevent the re-entry of the liquid gasolene from the chamber 12 to the fuel pump 11.

The expansible chamber 12 may be of bellows construction or a coil of neoprene or like coil tubing. When filled with gasolene, the flexibility of the chamber 12 is such that the fuel is ejected under a smooth constant pressure into a fuel line 16 rather than with a pulsating flow. The fuel line 16 may be made of steel or other metal alloy and may be attached to the exhaust manifold of the engine. As shown in FIG. 1, the line 16 may also be coiled about the exhaust manifold 17 of the engine and heated to a temperature above the boiling point of gasolene. At this elevated temperature the liquid fuel is vaporized or turned into a gaseous form.

The fuel first as a liquid and than after heating in gaseous form, is delivered through line 18 to an injector or an injection tube 19 having an orifice disposed above, substantially normal to, and in close proximity to a flat metal plate 20. The flat plate 20 is disposed horizontally in an air flow cannister 21 in which the fuel either in liquid or gaseous form is distributed to the pistons. In the form shown the air flow cannister is a carburetor so that fuel is mixed with air. This mixing is facilitated by the impingement of the fuel on the plate 19 from the injector 20 which causes the fuel to spread radially outwardly in all directions so that it is effectively dispersed and thoroughly mixed with air in the air flow cannister 21 for distribution to the pistons.

As shown in FIG. 2, the flat plate 20 is made of brass and is attached to the injector 19 by a bendable arm 25. The arm is bendable at its opposite ends to provide for adjustment of the gap between the injector 19 and the flat plate 20 for the different fuel flow requirements of the various automobiles. As is apparent to those skilled in the art, the flat plate 20 may be fixedly attached to the air cannister and the injector 19 adjustably attached in the air cannister by any conventional means so long as the flow of fuel from the injector 19 is substantially normal to the flat plate 20 and the proper gap is maintained between the injector 19 and flat plate 20.

Metering of the fuel to meet the engine demand is controlled by an adjustable metering valve 22 which is connected in the line 18 between the manifold 17 and the air cannister 21. The metering valve 22 is actuated and positioned by the usual accelerator and linkage assembly 23 which is also connected to the butterfly valve in the air cannister to maintain the proper air to fuel ratio. The metering valve 22 may also be controlled by standard vacumn, electronic, or mechanical means.

Also disposed in the line 18 is a shut-off valve 24. The valve 24 may be either of the vacuum or electric type and when actuated is operative to cut off flow to the injector when the engine is stopped. This maintains the fuel pressure in the line and the expansible chamber 12 so that upon restarting the engine, fuel is immediately available at the injector 19 under the pressure provided by the chamber 12. In the absence of a shut-off valve, the fuel would continue to flow through the injector 19 and flood the engine.

Although but one embodiment of the present invention has been illustrated and described, it will be apparent to those skilled in the art that various changes and modifications may be made therein without departing from the spirit of the invention.

What is claimed is:

1. In a fuel gasifying system for a piston type internal combustion engine, said fuel gasifying system including means for providing a liquid source of fuel under substantially constant pressure, tube means connected to said fuel source, heating means adjacent said tube means for gasifying said liquid fuel, the improvement comprising an injector tube connected to said tube means, a canister into which said injector tube axially projects, said canister communicating with the pistons for distributing the gasified fuel therein, said injector tube having an orifice through which said gasified fuel is axially introduced into said canister, and a deflecter having a surface disposed substantially normal to the longitudinal axis of said injector tube whereby said gasified fuel impinges thereagainst and is radially outwardly deflected into said canister and thereby effectively dispersed and thoroughly mixed with air in the proper gas to air ratio for combustion in the piston chambers.

2. The invention as defined in claim 1 wherein said fuel gasifying system includes a fuel pump providing pulsating flow of fuel and wherein said improvement further comprises an expansible chamber disposed in said tube means between said heat source and said fuel pump, a one way check valve disposed between said expansible chamber and said fuel pump whereby said fuel is prevented from reentering said fuel pump, whereby upon heating and gasification of said fuel and a corresponding expansion of said expansible chamber, said fuel is caused to be introduced into said canister through said injector tube at a constant pressure.

3. The invention as defined in claim 2 wherein said improvement further comprises a metering valve disposed between said heating means and said injector tube for metering the flow of gasified fuel into said canister.

4. The improvement as defined in claim 3 wherein shut-off means is provided between said expansible chamber and said metering means for preventing release of said fluid under pressure from said expansible chamber when said engine is shut-off.

* * * * *